Patented Nov. 19, 1940

2,222,199

UNITED STATES PATENT OFFICE 2,222,199

PIGMENTED PAPER AND PROCESS OF MAKING SAME

Louis C. Fleck, Appleton, Wis., assignor to Paper Patents Company, Neenah, Wis., a corporation of Wisconsin No Drawing. Original application July 1, 1937, Serial No. 151,456. Divided and this application July 5, 1938, Serial No. 217,604

12 Claims. (Cl. 92—21)

My invention relates to the manufacture of paper, and has to do more particularly with the incorporation with, or application to, paper making materials or paper, of aluminum phosphate pigments including aluminum phosphate and aluminum phosphate complexes for improving the color and particularly the brightness or whiteness of finished paper.

The present application is a continuation in part of my co-pending application, Serial No. 47,-144, filed October 28, 1935, and is a divisional application of my co-pending application, Serial No. 151,456, filed July 1, 1937. The present application is directed in particular to the aluminum phosphate-calcium sulphite combination pigments and complexes of the same.

Heretofore various inorganic materials have been used to fill paper and increase its brightness or light-reflecting index. The materials commonly used are clay, talc, chalk, and the like. All clays, however, with which I am familiar have a much lower power of producing brightness in paper than my materials. They are incorporated in paper primarily as fillers although they necessarily have some pigmenting properties. My aluminum phosphate compositions on the other hand are employed as fillers and coating compositions in place of other fillers and other coating compositions primarily because of their unusual pigmenting properties.

The principal object of my invention is to provide an improved paper pigment.

Another object of my invention is to provide a paper pigment having high brightness-imparting properties combined with low cost.

Another object of my invention is to provide a paper pigment particularly adapted for use with paper materials containing substantial amounts of ground wood fibers.

A still further object of my invention is to provide a paper pigment having a remarkable covering power.

Further objects will be apparent as the description hereinafter proceeds.

I have discovered that aluminum phosphate pigments and particularly the aluminum phosphate-calcium sulphite complexes to which the present application is directed, are of superior merit in the pigmenting of paper and have the added advantage of being less expensive than fillers and pigments of equivalent brightness such as titanium dioxide previously used. Although my invention is not to be limited by any theory of operation, the brightening power of my pigments appears to reside in the unusual covering power and ease with which these compounds or complexes distribute themselves on cellulosic fibers.

For a proper interpretation of the terms used in the specification and claims, it is to be understood that the word "pigment" refers to white compositions which are sufficiently insoluble under conditions of use making them suitable paper fillers and coating compositions, that the word "filler" includes material on the surface of the paper as well as that which is incorporated in the sheet, that the words "paper sheets" includes sheets of any thickness from thin tissue to thick board, and that the words "alkaline materials" include alkali and alkaline earth materials and alkaline magnesium and zinc compounds.

The pigmenting compositions included in my invention comprise insoluble aluminum phosphates and all insoluble white complexes containing the aluminum and the phosphate radicals. Alkali and alkaline earth-aluminum phosphate complexes which are insoluble under paper making conditions have been found to be particularly good paper pigments.

In the preparation of my pigments which may be prepared in any suitable manner such, for example, as by reacting compounds of aluminum with acids, oxides, or salts of phosphorus, by treatment of aluminum silicate clays or bauxite with phosphoric acid, or by treatment of other ores or naturally occurring minerals of aluminum and phosphorus, it is especially desirable that the conditions of reaction be so adjusted that the particle size of the precipitate be extremely small. This may be accomplished by known technique as by adjusting concentration, temperature, order of addition of reagents, presence of protective colloids, etc. in accordance with known physical chemical principles.

It is also contemplated by my invention that aluminum phosphate pigments may be precipitated in the presence of paper making fibers, in which case the pigment will be deposited directly onto the fibers, for example, in the beater or chest or after the formation of the web. As an alternative my pigments may be separately prepared and added to the fibers either before formation of the paper web or thereafter as a coating.

It should be understood that throughout the specification and claims the term "aluminum phosphate pigment" is intended to cover not only substantially insoluble aluminum phosphates, but also various other white physical and chemical combinations or complexes of aluminum and the phosphate radical which are substantially insoluble under paper making conditions and which might occur under varying conditions. Thus compounds coming within my invention may include acid or basic aluminum phosphates, double phosphates as, for example, the double phosphate of aluminum and calcium; and other modifications or compositions containing various basic or acid radicals which in view of the complex nature of the molecule are difficult to analyze and assign a definite chemical formula.

Aluminum phosphate complexes may also, within my invention, be used in admixture with known or other suitable fillers or pigments applicable to paper manufacture, as, for example, clay, chalk, calcium sulphite, calcium phosphate, calcium sulphate, barium sulphate, etc. Such a combination may be a simple physical mixture although for some types of pigments the use or precipitation of my aluminum phosphate pigments with or on the other pigments has been found to produce a combination pigment having higher brightness-imparting characteristics in paper than either of the individual pigments when used alone and in like percentages.

Of the combination pigments the calcium sulphite-aluminum phosphate composition or complex possesses unusual pigmenting properties. A paper containing a pigment, for example, consisting of about 80 per cent calcium sulphite and 20 percent aluminum phosphate material has a brightness about equal to a paper containing an equal amount of a pigment consisting of 100 percent aluminum phosphate material although the brightness of a paper containing calcium sulphite is considerably lower than that of a paper containing an equal amount of my aluminum phosphate pigments. Another combination pigment consisting of 60 percent calcium sulphite and 40 percent aluminum phosphate material produces a brightness greater than that of a pigment consisting of 100 percent aluminum phosphate pigmenting material. My investigations have led me to believe that in the above combinations a physical-chemical change occurs resulting in a crystalline structure that is responsible for the improved brightness-imparting properties in paper.

In general, when aluminum phosphate complexes are prepared for use in connection with my invention, either in or out of the presence of paper making fibers, such preparation may consist of the reaction, preferably in water, of soluble salts containing aluminum, e. g. aluminum sulphate, aluminum nitrate, aluminum chloride, aluminum acetate, aluminum formate, sodium and potassium aluminates (alkali aluminates) etc., or an aqueous dispersion of aluminum hydroxides or aluminum sulphite etc. with soluble or insoluble compounds containing the phosphate radical, e. g. the phosphoric acids, the sodium phosphates, etc. The pH value of the reaction monium phosphates, magnesium phosphates, zinc phosphates, etc. The pH value of the reaction mixture may be adjusted to permit the desired precipitation of the pigment. If the pH value is too low, the pigment may be modified by addition of an alkaline material such as sodium hydroxide, calcium hydroxide, barium hydroxide, magnesium oxide, trisodium phosphate, sodium aluminate or sodium zincate, etc., or if desired, carbonates of the alkali and alkaline earth metals or magnesium, etc. may be employed. If the pH value is too high, it may be lowered by the addition of acids such as phosphoric acid or acid reacting salts such as aluminum sulphate, aluminum chloride, or aluminum sulphite, etc. In general, the pH range used is about 3.8 to 9, although a range of 4.5 to 5.5 is preferred. The precipitate should be white and substantially insoluble in pure water and, of course, be practically insoluble under varying paper making conditions. When an alkaline material, such, for example, as calcium hydroxide is added as indicated above to raise the pH value, the resultant precipitate appears to be a double salt of calcium and aluminum phosphate.

The brightness values in all cases mentioned through the specification were obtained employing the General Electric Reflectance meter using the No. 1 or brightness filter. The General Electric Reflectance meter is well known throughout the paper industry and is used almost exclusively for making standard brightness comparative tests. The clay used in my comparative tests is the ordinary Georgia Kaolin employed by the paper industry.

The following examples will serve to illustrate my invention.

*Example I*

About 600 pounds of sodium hydroxide and about 600 pounds of aluminum hydrate are added to about 290 gallons of water and boiled for approximately 20 to 30 minutes until the solution is clear. The solution is diluted to about 720 gallons with water and then added slowly to about 720 gallons of water to which separately but at the same time about 1640 pounds of 75 percent phosphoric acid diluted to 720 gallons with water is being slowly added. To the above solution sufficient paper makers alum (aluminum sulphate) is added so that the final solution has a pH value of approximately 5. The precipitate formed may be separated by filtration in the usual manner.

In the above example the proportions on a dry basis are approximately 2 parts alkali hydroxide, 2 parts aluminum hydrate, 4 parts phosphoric acid and 2 parts paper makers alum.

The pigment prepared by the method described above may be used in varying proportions with paper. A pigment may comprise for example, as high as about 30 percent by weight of the paper or as low as about 1 percent by weight of the paper. A paper made up of 50 percent ground wood and 50 percent bleached sulphite fiber furnish and containing about 2.5 percent of the pigment prepared by the method described in Example I, shows an improvement of approximately two points in brightness over paper made with a similar fiber furnish without any filler and approximately one point improvement in brightness over that obtained from paper with the same fiber furnish containing 2.5 percent ordinary clay filler. The improvement in brightness is plainly discernible to the eye, which is quite unusual.

The pigment prepared by the method described in Example I may also be employed to advantage with other fillers. The following examples will serve for purposes of illustration.

*a.* Paper made up of 50 percent ground wood and 50 percent bleached sulphite fiber furnish and containing 20 percent by weight of inorganic filler material consisting of 95 percent ordinary clay and 5 percent aluminum phosphate pigment of Example I shows an improvement of approximately two points in brightness over paper made with a similar furnish containing 20 percent all clay filler. Although the paper in this example contains only 1 percent by weight of my aluminum phosphate complex, the improvement in brightness is of such magnitude as to be plainly discernible to the eye, and thus shows the remarkable pigmenting power of my improved materials.

b. Paper made up of 50 percent ground wood and 50 percent bleached sulphite fiber furnish and containing 20 percent inorganic filler material consisting of 95 percent calcium sulphite and 5 percent aluminum phosphate pigment of Example I, shows an improvement of approximately four points in brightness over paper made with a similar fiber furnish containing 20 percent all calcium sulphite filler. This example in which the paper contains only 1 percent by weight of my aluminum phosphate complex also illustrates the remarkable pigmenting power of my compositions.

c. A paper made up of 50 percent ground wood and 50 percent bleached sulphite fiber furnish and containing 2.5 percent inorganic filler material consisting of 45 percent calcium sulphite and 55 percent aluminum phosphate pigment of Example I, shows an improvement of approximately two points in brightness over paper made with the same fiber furnish without any filler and approximately one point improvement in brightness over paper made with a similar fiber furnish containing 2.5 percent ordinary clay filler. This example in which the paper contains about 1.375 percent of my aluminum phosphate complex illustrates the remarkable pigmenting power of my improved compositions when used with small amounts of other fillers.

d. A paper made up of 50 percent ground wood and 50 percent bleached sulphite fiber furnish and containing 10 percent inorganic filler material, consisting of 85 percent clay and 15 percent of a mixture consisting of 45 percent calcium sulphite and 55 percent aluminum phosphate pigment of Example I, shows an improvement of approximately two points in brightness over paper made with a similar fiber furnish containing 10 percent of clay filler. This example in which my aluminum phosphate pigment represents only about 0.825 percent shows the remarkable pigmenting power of my Al PO4CaSO3 composition or complex when used with other fillers.

e. A paper made up of 50 percent ground wood and 50 percent bleached sulphite fiber furnish and containing 20 percent inorganic filler material consisting of 60 percent clay and 40 percent of a mixture consisting of 45 percent calcium sulphite and 55 percent aluminum phosphate pigment of Example I, shows an improvement of approximately 9.2 points in brightness over paper made with the same fiber furnish without filler. This improvement is approximately 0.5 points lower than that obtained for paper made with a similar fiber furnish containing 20 percent of aluminum phosphate pigment of Example I and is an improvement of about 3.1 points in brightness over a paper made from a similar fiber furnish containing 20 percent of clay filler. This example in which the filler contains about 22 percent aluminum phosphate pigment or about 4.4 percent based on the total weight of the paper, shows the effective brightening power of my aluminum phosphate complex-calcium sulphite pigment compositions.

f. A paper made of 50 percent ground wood and 50 percent bleached sulphite fiber furnish and containing 20 percent inorganic filler material consisting of 45 percent calcium sulphite and 55 percent aluminum phosphate pigment of Example I, shows an improvement of approximately 10.7 points in brightness over paper made from a similar fiber furnish containing no added filler. This improvement is greater by approximately one point than that obtained for paper made with a similar fiber furnish containing 20 percent of aluminum phosphate pigment of Example I and is an improvement of about 4.4 points in brightness over paper made from a similar fiber furnish containing 20 percent all clay filler. This example in which the aluminum phosphate pigment represents 11 percent of the weight of the paper and the calcium sulphite represents 9 percent of the weight of the paper, illustrates the remarkable pigmenting power of my pigment when used with calcium sulphite.

g. A paper made of 50 percent ground wood and 50 percent bleached sulphite fiber furnish and containing 20 percent inorganic filler material consisting of 95 percent calcium phosphate and 5 percent aluminum phosphate pigment of Example I, shows an improvement of approximately 1.1 points in brightness over paper made from a similar fiber furnish filled with 20 percent all calcium phosphate filler and is an improvement of approximately 2.2 points in brightness over paper made from a similar fiber furnish and filled with an all clay filler of the same pigment content.

*Example II*

About 558 pounds of 75 percent phosphoric acid diluted with 558 pounds of water are mixed with about 720 pounds of iron-free paper makers alum dissolved in about 720 pounds of water. To this mixture is added an aqueous calcium hydroxide suspension containing approximately 100 grams of $Ca(OH)_2$ per liter of water until the pH value has been raised to about 5.0 to 5.2. The calcium aluminum phosphate complex precipitate obtained is an extremely good paper pigment. The following examples will serve for purposes of illustration.

h. A paper made of 50 percent ground wood and 50 percent bleached sulphite fiber furnish and containing 20 percent inorganic filler material consisting of the aluminum phosphate pigment of Example II shows an improvement of approximately 10 points in brightness over paper made with a similar fiber furnish containing no added filler and an improvement of 5.5 points in brightness over paper made with a similar fiber furnish filled with 100 percent clay to the same pigment content. This improvement is of the same magnitude as that obtained with aluminum phosphate pigment of Example I.

i. A paper made of 50 percent ground wood and 50 percent bleached sulphite fiber furnish and containing 2.5 percent inorganic filler material consisting of the aluminum phosphate pigment of Example II, shows an improvement of approximately 2 points in brightness over paper made with a similar fiber furnish containing no added filler and an improvement of more than one point in brightness over paper made with a similar fiber furnish filled with 100 percent clay filler to a pigment content of 2.5 percent.

*Example III*

About 975 pounds of 75 percent phosphoric acid and about 780 pounds of 95 percent sulphuric acid are mixed with 5800 pounds of water. About 585 pounds of aluminum hydrate are added to the above acid mixture which is then heated to a boil for approximately 20 to 30 minutes until the aluminum hydrate dissolves. The pH value may be adjusted by adding the solution to about 7800 pounds of an aqueous suspension of calcium hydroxide containing about 100 grams of calcium hydroxide per liter of water. The use of the mixture of acids appears to form a phosphate-sulphate aluminum complex resulting in a pigment possessing unusual paper pigmenting properties.

*Example IV*

Similarly, an aluminum phosphate complex may be prepared by mixing an aqueous solution of acid calcium phosphate (obtained for example by extraction from triple super phosphate fertilizer) with alum (aluminum sulphate) and calcium hydroxide. This pigment may be used to advantage with calcium sulphate, the pigment or filler mixture showing a decided improvement in brightness over a filler of 100 percent calcium sulphite used in like percentages.

*Example V*

Similarly, an aluminum phosphate complex may be prepared by mixing in water aluminum sulphite and phosphoric acid and sufficient alkaline material, such as sodium aluminate, calcium hydroxide, barium hydroxide, barium carbonate or magnesium carbonate, etc. to raise the pH value to about 3.8 to 5.5. If the pH value goes over to the alkaline side, i. e. pH 7 or 8, it may be lowered to the preferred value by adding alum or additional aluminum sulphate.

*Example VI*

The phosphoric acid used in the preceding Examples, I, II and III or the calcium phosphate used in Example IV may be replaced partially or in whole by alkali phosphates such as sodium phosphate, particularly the disodium phosphate. Thus, for example, by mixing 50.9 pounds of disodium phosphate in 191 pounds of water, with 59 pounds of alum in 87 pounds of water, and adjusting the pH value to 3.8 to 9 with alkali or alkaline oxides, hydroxides or carbonates, an aluminum phosphate complex precipitate is obtained having good pigmenting properties.

When using my aluminum phosphate pigments with calcium sulphite and clay, for instances, Georgia kaolin, it has been found desirable to use between 10 and 30 percent aluminum phosphate pigment, 15 and 45 percent calcium sulphite and 25 and 75 percent clay, the preferred ratio of aluminum phosphate pigment to calcium sulphite being approximately 40 to 60 percent. Paper, for example, containing about 10 percent or more of inorganic filler material comprising 24 percent aluminum phosphate pigment (e. g. Example I), 36 percent calcium sulphite and 40 percent clay has been found to possess an extremely high brightness. Another filler mixture coming within the preferred range consists of 18 percent aluminum phosphate pigment (e. g. Example II or III), 27 percent calcium sulphite and 55 percent clay. The paper made using the above inorganic compositions contains ordinarily at least 10 percent filler material at least 1 percent of which is aluminum phosphate pigment.

*Coating pigments*

Where the aluminum phosphate complexes are to be used as a coating pigment, they may replace all or part of the pigments such as clay, etc., generally used for coating paper. For this purpose it is customary to have the pigment so treated that it is at a pH value of approximately 5.0 to 8.5 and preferably 6.5 to 7.0 before adding adhesive material, such as casein, starch, soya bean protein, etc.

I have found that paper sheets coated with a clay coating composition containing about 1 percent aluminum phosphate pigment based on the mineral ingredients employed and made for example as described in Example I show an increase in brightness of about one point over sheets similarly coated merely with the clay coating composition. I have also found that paper sheets coated with a calcium sulphite coating composition containing about 7.5 percent of aluminum phosphate pigment based upon mineral ingredients employed show an increase in brightness of about one point over sheets similarly coated merely with the calcium sulphite coating composition. While the above coating compositions contain a relatively small percentage of my aluminum phosphate pigments, and show an increase in brightness of only one point over the other coating compositions, the increase is perceptible to the eye and is of great commercial importance in the paper industry. When an extremely high brightness is desired, I have discovered that paper sheets coated with a coating composition in which the only mineral ingredient employed is my aluminum phosphate pigment will have a brightness of approximately fourteen points higher than sheets coated with a clay coating composition and approximately 10.5 points higher than sheets coated with a calcium sulphite coating composition, all coating compositions employing the same proportion of mineral ingredients. Ordinarily the mineral ingredients of my coating compositions will contain at least 5 percent of my aluminum phosphate pigments although when the Germanson-Kranhold process described in U. S. Patent No. 1,918,095, dated July 11, 1933, is being used, I prefer to use a coating composition containing at least about 10 percent of my aluminum phosphate pigment. The references above to increased brightness refer to papers containing at least ten pounds of coat per ream. In case lighter coatings are employed the improved brightness corresponds to the amount of coating.

The following examples will serve to illustrate the preparation of pigments particularly adapted for coating purposes.

*Example VII*

About 600 pounds of sodium hydroxide and about 600 pounds of aluminum hydrate are added to about 290 gallons of water and boiled for approximately 20 to 30 minutes until the solution is clear. The solution is diluted to about 720 gallons with water and then added slowly to about 720 gallons of water to which separately but at the same time about 1640 pounds of 75 percent phosphoric acid diluted to 720 gallons with water is being slowly added with vigorous agitation. The pH value of the final mixture is about 7.0. The precipitate formed is recovered by filtration in the usual manner. This pigment may be sized with casein, starch or other sizing agents by recognized methods to give coatings having a pH value of 6 to 8.5. Combination pigments of my aluminum phosphate pigment with clay, calcium phosphate, calcium sulphite, calcium carbonate, barium sulphate, calcium sulphate or other known pigments, may be made by precipitating the aluminum phosphate complex in the presence of the other pigments.

Example VIII

About 107 pounds of 75 percent phosphoric acid and about 134 pounds of paper makers alum are dissolved in approximately 900 pounds of water and stirred until a clear solution is obtained. About 385 pounds of barium hydroxide (hydrated) is dissolved in about 2100 pounds of water at approximately 45% C. The acid-alum solution and the barium hydroxide solution are then added separately but at the same time to about 800 pounds of water. The pH value of the final mixture is approximately 6.5. The precipitate formed may be recovered by filtration in the usual manner. This pigment may also be sized with casein, starch, etc., by recognized methods to give coating solutions having a pH value of 6 to 8.5. This pigment may be mixed with other paper pigments or preferably combined with other pigments in a manner similar to that of coating pigment, Example VII.

Example IX

A 25 percent aqueous solution of about 23 pounds of disodium phosphate is vigorously mixed with a 25 percent aqueous solution of about 27 pounds of paper makers alum. The precipitate formed may be filtered and washed and made up to a slip of suitable consistency and treated with alkaline material such as trisodium phosphate, calcium hydroxide, sodium bicarbonate, etc. to bring the pH value up to approximately 5.0 to 7.0. This pigment slip may also be sized with casein, starch, soya bean protein, glue or other adhesives according to the well known practices of the art. The coating mixtures may be treated if desired in a ball mill or colloidal mill to insure good dispersion.

In the above filler and coating examples it will be understood that my pigments may be used under varying conditions according to well known practices in the art. For example, it will be understood that my invention is not limited by the preferred order of addition of the various materials, equally good results being obtained when the alkaline materials are added to the acid materials or vice versa. It will also be understood by those skilled in paper manufacture that the common sizing compositions including alum, rosin, starch and the like may be used in conjunction with my novel pigmenting compositions.

It will also be understood by those skilled in the art that the oxides or carbonates of alkaline materials, including the alkali and alkaline earth metals, are considered to be equivalents of the hydroxides and may be used in place of the hydroxides by properly adjusting the proportions, etc.

While my invention is not limited to any particular theory, my investigations lead me to believe that my improved pigmenting compositions possess a remarkable covering power as shown by the ease with which they "plate" or distribute themselves on the cellulosic fibers. When my aluminum phosphate complexes are used in conjunction with other fillers they not only improve the brightness of the mixture or combination pigment, but in addition appear to impart to the composition or mixture the remarkable covering power. The molecular structure of my pigments along with their absorptive power are believed important factors in my improved compositions or complexes.

My pigments may be used in any furnish but have been found of particular value for use in a furnish containing ground wood fibers, where it has been known for some time that ordinary alkaline fillers such as calcium carbonate should not generally be used when a white sheet is desired. The ground wood containing all of the organic and inorganic materials of natural wood such as lignin, tannins, etc. darkens in color in an alkaline medium. Extensive investigation, however, employing my aluminum phosphate pigments with paper sheets containing 0, 10, 50 or even 95 percent ground wood have given excellent results, the paper retaining its high brightness or whiteness under varying conditions.

Numerous other applications of my invention will doubtless suggest themselves to those skilled in the art without departing from the spirit of my invention. Hence, I do not wish to be limited to the specific details or embodiments disclosed herein, but intend that the scope of my invention shall be determined from the appended claims, which should be interpreted as broadly as the state of the art will permit.

I claim:

1. Paper containing mineral pigmenting material having as essential elements an aluminum phosphate pigment and calcium sulphite, the pigmenting material of said paper being made up of at least five per cent of said aluminum phosphate pigment.

2. As an article of manufacture, a paper sheet containing a filler material comprising aluminum phosphate pigment and calcium sulphite, said filler consisting of at least five percent aluminum phosphate pigment and said sheet containing at least one percent of said aluminum phosphate pigment.

3. As an article of manufacture, a paper sheet containing about twenty percent filler material comprising calcium sulphite and at least five percent aluminum phosphate pigment.

4. As an article of manufacture, a paper sheet containing at least ten percent of a filler material comprising pre-formed aluminum phosphate pigment, calcium sulphite and clay, said filler material being made up of at least five per cent of said aluminum phosphate pigment.

5. As an article of manufacture, a paper sheet containing a filler material comprising about ten to thirty percent aluminum phosphate pigment, about fifteen to forty-five percent calcium sulphite and about twenty-five to seventy-five percent clay.

6. As an article of manufacture, a paper sheet containing a filler material consisting of at least forty percent clay and the remainder comprising aluminum phosphate pigment and calcium sulphite, said filler material containing at least five per cent of said aluminum phosphate pigment.

7. As an article of manufacture, a paper sheet containing a filler material consisting of about forty percent clay, about twenty-four percent aluminum phosphate pigment and about thirty-six percent calcium sulphite.

8. As an article of manufacture, a paper sheet containing a filler material consisting of about fifty-five percent clay, eighteen percent aluminum phosphate pigment and about twenty-seven percent calcium sulphite.

9. As an article of manufacture, a paper sheet containing at least about ten percent of a filler material comprising an aluminum phosphate pigment and calcium sulphite, said sheet being made up of at least one percent of said aluminum phosphate pigment and containing less than ten percent calcium sulphite and said filler material being made up of at least five percent of said aluminum phosphate pigment and containing less than fifty percent calcium sulphite.

10. As an article of manufacture, a paper sheet containing a filler material comprising a substantial proportion of an aluminum phosphate pigment and a minor proportion of calcium sulphite, said filler material containing at least ten percent of said aluminum phosphate pigment.

11. The improvement in the art of manufacturing a filled paper containing as essential ingredients wood fibers and filler material which comprises forming said filled paper by applying to said fibers an aluminum phosphate pigment and calcium sulphite, the filler material of said paper being made up of at least five percent of said aluminum phosphate pigment.

12. The improvement in the art of manufacturing a pigmented paper containing as essential ingredients wood fibers and mineral pigmenting material which comprises forming said pigmented paper by forming a paper web and applying to said web a pigmenting material containing an aluminum phosphate pigment and calcium sulphite, said pigmenting material containing at least five percent of said aluminum phosphate pigment.

LOUIS C. FLECK.

CERTIFICATE OF CORRECTION.

Patent No. 2,222,199. November 19, 1940.

LOUIS C. FLECK.

It is hereby certified that error appears in the printed specification of the above numbered patent requiring correction as follows: Page 2, first column, lines 62 and 63, for the words "phosphates, etc. The pH value of the reaction monium phosphates" read --phosphates, the various calcium phosphates, ammonium phosphates--; page 4, second column, line 38, for "5 percent" read --about 5 percent--; page 5, first column, line 8, for "45% C." read --45° C.--; and that the said Letters Patent should be read with this correction therein that the same may conform to the record of the case in the Patent Office.

Signed and sealed this 21st day of January, A. D. 1941.

(Seal)

Henry Van Arsdale,
Acting Commissioner of Patents.